(12) United States Patent
Keithley

(10) Patent No.: US 7,468,737 B2
(45) Date of Patent: Dec. 23, 2008

(54) METHOD AND APPARATUS FOR DETERMINING THE MECHANICAL SINUSOIDAL DEFLECTION ANGLE OF AN OSCILLATING MIRROR IN A LASER PRINTER

(75) Inventor: Douglas Gene Keithley, Boise, ID (US)

(73) Assignee: Marvell International Technology Ltd. (BM)

( * ) Notice: Subject to any disclaimer, the term of this patent is extended or adjusted under 35 U.S.C. 154(b) by 217 days.

(21) Appl. No.: 10/913,735

(22) Filed: Aug. 6, 2004

(65) Prior Publication Data

US 2006/0028532 A1  Feb. 9, 2006

(51) Int. Cl.
*B41J 2/44* (2006.01)
*B41J 2/47* (2006.01)
*G02B 26/02* (2006.01)

(52) U.S. Cl. ........................ 347/247; 359/224
(58) Field of Classification Search ................. 382/323; 358/296; 347/256, 260, 224, 225, 247; 359/224
See application file for complete search history.

(56) References Cited

U.S. PATENT DOCUMENTS

| | | | | |
|---|---|---|---|---|
| 4,214,154 A | * | 7/1980 | Sato | 250/201.1 |
| 4,990,763 A | * | 2/1991 | Shinada | 250/205 |
| 5,274,461 A | * | 12/1993 | Mitsuhashi | 358/296 |
| 6,229,637 B1 | * | 5/2001 | Suzuki et al. | 359/198 |
| 6,972,883 B2 | * | 12/2005 | Fujii et al. | 359/224 |
| 2003/0021497 A1 | * | 1/2003 | Kandori et al. | 382/323 |
| 2003/0210323 A1 | | 11/2003 | Turner | |
| 2004/0004775 A1 | | 1/2004 | Turner et al. | |
| 2004/0027449 A1 | | 2/2004 | Turner et al. | |
| 2004/0051033 A1 | | 3/2004 | Hagen et al. | |

FOREIGN PATENT DOCUMENTS

JP  2004279955  10/2004

OTHER PUBLICATIONS

Great Britian Search Report on Application No. GB051607.8, Date of search: Sep. 26, 2005, (1 page).

* cited by examiner

*Primary Examiner*—Huan H Tran

(57) ABSTRACT

A laser printer includes a light source, a photosensitive drum, an oscillating mirror, a beam detector, and a control circuit. The light source shines a light beam towards the oscillating mirror, which reflects the light beam towards the photosensitive drum. The beam detector detects light reflected from the oscillating mirror. A reflected light beam hits the beam detector twice in each period of the oscillating mirror. The time interval between detected beams is used to determine the maximum mechanical deflection angle of the oscillating mirror. In an alternate embodiment, two beam detectors are used to detect light reflected from the oscillating mirror and determine its maximum mechanical deflection angle.

34 Claims, 4 Drawing Sheets

METHOD AND APPARATUS FOR DETERMINING THE MECHANICAL SINUSOIDAL DEFLECTION ANGLE OF AN OSCILLATING MIRROR IN A LASER PRINTER

BACKGROUND OF THE INVENTION

A rotating photosensitive drum in a laser printer is exposed to a light beam from a laser source to create an image that is coated with toner and then transferred to a piece of paper. The light beam scans across the drum one line a time. However, the laser source itself does not physically move. Instead, the light beam is aimed at a movable reflective surface that simultaneously reflects and scans the light beam across the drum.

Conventional laser printers use a rotating polygonal block having multiple reflective surfaces to achieve the scanning motion. Recent innovations propose using just a single mirror with a single reflective surface, such as a Micro Electro Mechanical Systems (MEMS) mirror that oscillates about an axis.

SUMMARY OF THE INVENTION

In a preferred embodiment, a laser printer includes a light source, a photosensitive drum, an oscillating mirror, a beam detector, and a control circuit. The light source shines a light beam towards the oscillating mirror, which reflects the light beam towards the photosensitive drum. The beam detector detects light reflected from the oscillating mirror. A reflected light beam hits the beam detector twice in each period of the oscillating mirror. The time interval between detected beams is used to determine the maximum mechanical deflection angle of the oscillating mirror.

In an alternate embodiment, two beam detectors are used to detect light reflected from the oscillating mirror and determine its maximum mechanical deflection angle.

Further features and advantages of the present invention, as well as the structure and operation of preferred embodiments of the present invention, are described in detail below with reference to the accompanying exemplary drawings.

BRIEF DESCRIPTION OF THE DRAWINGS

In the drawings, like reference numbers indicate identical or functionally similar elements. The drawings are not to scale.

DETAILED DESCRIPTION

Figure 1A:
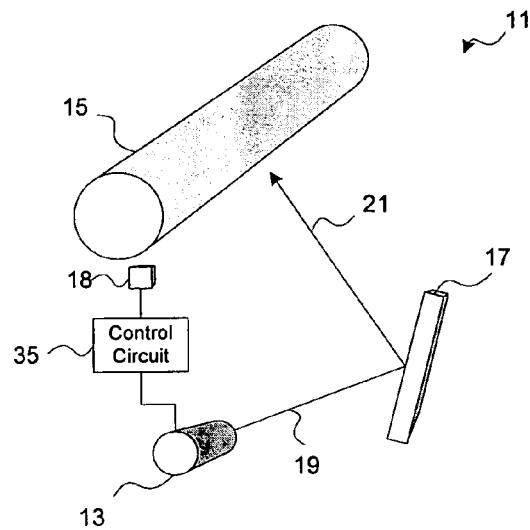
FIGS. 1A-1C illustrate an exemplary embodiment of a laser printer.
Figure 1B:
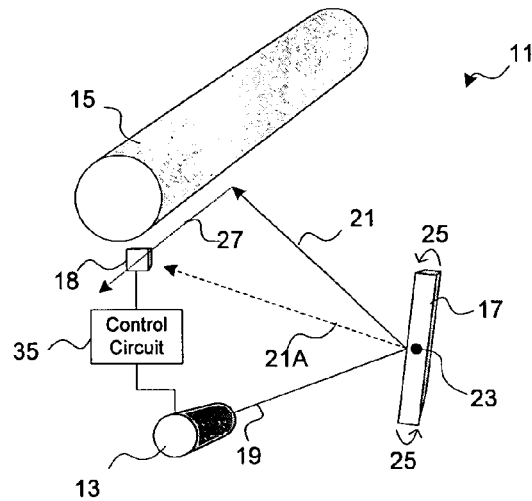
Figure 1C:
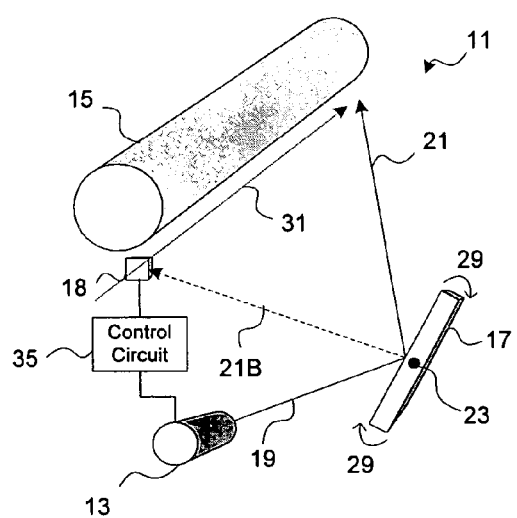

FIGS. 1A-1C illustrate an exemplary embodiment of a laser printer 11, according to the teachings of the present invention. Referring to FIG. 1A, the laser printer 11 includes a light source 13, a photosensitive drum 15, an oscillating mirror 17, a beam detector 18, and a control circuit 35. The light source 13 shines a light beam 19 towards the oscillating mirror 17. The oscillating mirror 17 has a reflective surface that faces the light beam 19. When the light beam 19 strikes the oscillating mirror 17, the light beam 19 is reflected towards the photosensitive drum 15, as illustrated by reflected light beam 21.

Referring to FIG. 1B, the oscillating mirror 17 pivots about an axis indicated by dot 23, and typically oscillates at a fixed frequency. In a preferred embodiment, the axis is a central axis, but it is possible for the oscillating mirror 17 to pivot around a non-central axis as well. The oscillating mirror 17 can be any device with a reflective surface that can oscillate at a fixed frequency, such as a MEMS mirror. Exemplary MEMS mirrors are described in U.S. Patent Application Publication No. US 2003/0210323 by Turner, and U.S. Pat. No. 6,522,802 by Hoen, assigned to Agilent Technologies, Inc. When the oscillating mirror 17 pivots in one direction, the reflected light beam 21 travels across the photosensitive drum 15 in a forward pass.

Figure 6:
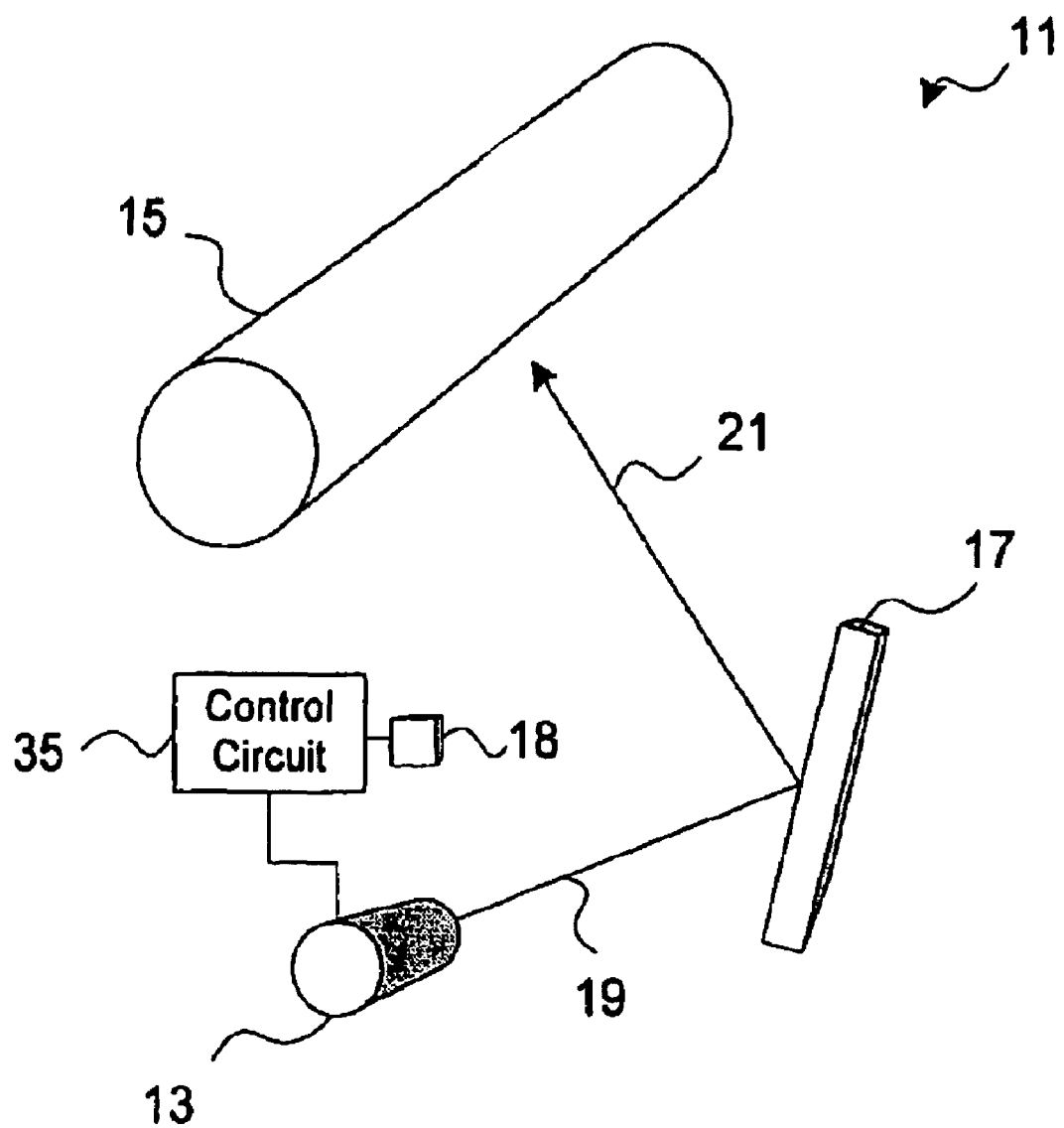
FIG. 6 illustrates another embodiment of the laser printer.

The beam detector 18 is positioned to intercept the reflected light beam 21 after it has finished traveling across the photosensitive drum 15. In FIGS. 1A-1C, the beam detector 18 is located further from the light source 13 and closer to the end of the photosensitive drum 15 for the sake of illustration only. Typically the beam detector 18 is located closer to the light source 13, so that they may share the same circuit board. FIG. 6 illustrates another embodiment of the laser printer with the beam detector 18 located closer to the light source 13. However, it should be understood that other locations for the beam detector 18 are acceptable as well.

During the forward pass, the reflected light beam 21 will hit the beam detector 18 once. For example, when the oscillating mirror 17 pivots in the direction indicated by arrows 25, the reflected light beam 21 will sweep across the photosensitive drum 15 in the direction indicated by arrow 27. The reflected light beam 21 hits the beam detector 18 as it makes a forward pass across the photosensitive drum, as illustrated by reflected light beam 21A. As shown by the arrow 27, generally the motion of the oscillating mirror 17 is such that the forward pass of the reflected light beam 21 will continue beyond the beam detector 18 as the oscillating mirror 17 finishes pivoting in that direction.

Referring to FIG. 1C, when the oscillating mirror 17 pivots in the opposite direction, the reflected light beam 21 travels back across the photosensitive drum in a return pass. During this return pass, the reflected light beam 21 will also hit the beam detector 18 once. For example, when the oscillating mirror 17 pivots in the direction indicated by arrows 29, the reflected light beam 21 will sweep across the photosensitive drum 15 in the direction indicated by arrow 31. The reflected light beam 21 hits the beam detector 18 after it begins its return pass, as illustrated by reflected light beam 21B.

One period of the oscillating mirror 17 consists of a forward pass and a return pass. As the oscillating mirror 17 oscillates, it alternates between forward and return passes while the photosensitive drum 15 rotates. By varying the intensity of the light beam 19 during each pass, an image is created row by row on the photosensitive drum 15. The image is coated with toner and transferred to a piece of paper.

Figure 2:
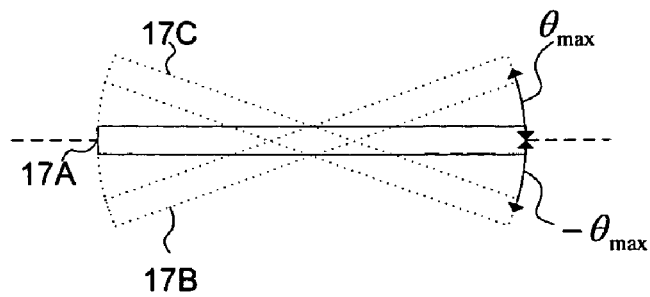
FIG. 2 illustrates the oscillating mirror and its movement in greater detail.

FIG. 2 illustrates the oscillating mirror 17 and its movement in greater detail. Generally, the oscillating mirror 17 does not make a full rotation; instead, its range of motion is constrained. The neutral position of the oscillating mirror is indicated by the solid outline of oscillating mirror 17A. The maximum pivot that the oscillating mirror makes in either direction is indicated by the dotted outlines of oscillating mirrors 17B and 17C. The oscillating mirror 17 oscillates between these two positions 17B and 17C.

The angle between the actual position of the oscillating mirror 17 and its neutral position is defined as the mechanical deflection θ of the oscillating mirror 17. The maximum mechanical deflection of the oscillating mirror 17 is defined as $\theta_{max}$, as shown in the figure.

Figure 3:
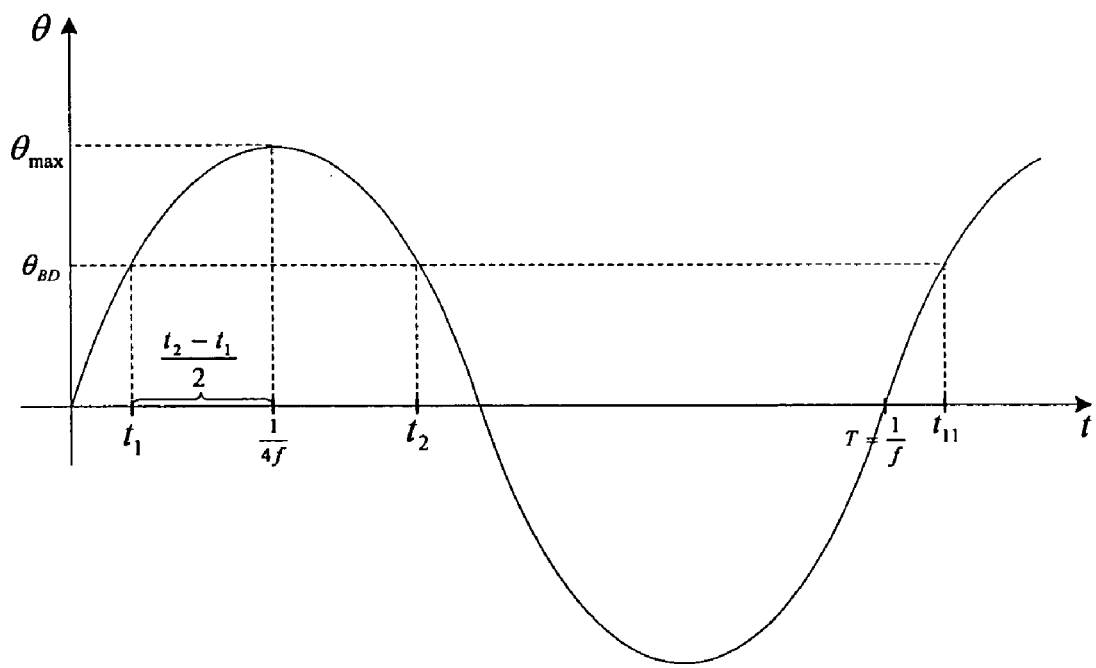
FIG. 3 illustrates a graph of the mechanical deflection of the oscillating mirror versus time.

FIG. 3 illustrates a graph of the mechanical deflection θ of the oscillating mirror 17 versus time t. The mechanical deflection θ may generally be approximated by a sinusoid having a frequency f and a maximum mechanical deflection $\theta_{max}$, although the actual mechanical deflection θ varies somewhat from being a perfect sinusoid. Generally $\theta_{max}$ is equal on both sides of the oscillating mirror 17. The sinusoid has a period T=1/f.

To characterize the oscillating mirror 17 and predict its behavior, both its frequency f and its maximum mechanical deflection $\theta_{max}$ must be known. These parameters are needed to calculate where the reflected light beam 21 is falling upon the photosensitive drum 15 at any given moment in time t, and the beam's linear velocity at that position, so that the intensity of the light source 13 may be adjusted appropriately for the image at that position.

Unfortunately, these parameters are different for each oscillating mirror, due to slight variations during the manufacturing process. The frequency f of the oscillating mirror 17 is the inverse of its period, which may be determined simply by timing the interval between consecutive forward passes (or consecutive return passes) of the reflected light beam 21. In FIG. 3, the period is simply calculated as $T=1/f=(t_{11}-t_1)$. However, determining $\theta_{max}$ is not necessarily so straightforward. In prior art, measurements and calibrations of each oscillating mirror are done at the time of manufacture to determine $\theta_{max}$ empirically, and then store the value in memory. This is time consuming and expensive to do.

Instead, the present invention calculates $\theta_{max}$, using information gathered by the beam detector 18. Referring back to FIGS. 1B and 1C, it can be seen that the reflected beam 21 strikes the beam detector 18 twice during each period of the oscillating mirror: once during the oscillating mirror's forward pass, and once during the oscillating mirror's return pass. Furthermore, the reflected beam 21 is always detected at the same mechanical deflection θ. This mechanical deflection angle will be defined as beam detection angle $\theta_{BD}$. The beam detection angle $\theta_{BD}$ is a known quantity, determined at the time of manufacture from the placement of the beam detector 18 and the oscillating mirror 17 relative to one another.

The graph in FIG. 3 shows the beam detection angle $\theta_{BD}$ and the two times (labeled $t_1$ and $t_2$) the beam detector 18 detects the reflected beam 21 during each period of the oscillating mirror. FIG. 3 also shows a portion of the subsequent period and beam detection at time $t_{11}$. As mentioned previously, the graph of the mechanical deflection θ versus time results in a sinusoid. Generally, a sinusoid can be described by the equation:

$$y = A\sin(2\pi ft - \phi)$$

where A is the amplitude, f is the frequency, and φ is the phase of the wave.

By using the equation for a sinusoid, we can calculate the $\theta_{max}$ for the printer, which is equal to the amplitude A of the sinusoid in FIG. 3. In a sinusoid, the maximum amplitude occurs at one-quarter of the period. In FIG. 3, this corresponds to $$t = \frac{1}{4f}.$$

Also, times $t_1$ and $t_2$ occur symmetrically around $$t = \frac{1}{4f}.$$

Consequently, $$t_1 = \frac{1}{4f} - \frac{(t_2 - t_1)}{2}$$

The phase φ can be set to zero, since the amplitude is independent of the phase value. Then, plugging the information gathered by the beam detector 18 into the sinusoid equation and solving for $\theta_{max}$:

$$y = A\sin(2\pi ft - \varphi)$$
$$\theta_{BD} = \theta_{max}\sin(2\pi ft_1)$$
$$\theta_{BD} = \theta_{max}\sin\left[2\pi f\left(\frac{1}{4f} - \frac{(t_2-t_1)}{2}\right)\right]$$
$$\theta_{max} = \frac{\theta_{BD}}{\sin\left[2\pi f\left(\frac{1}{4f} - \frac{(t_2-t_1)}{2}\right)\right]}$$

Therefore, by using a beam detector 18 to detect the reflected beams from the oscillating mirror 17, the interval between detection times $t_1$ and $t_2$ can be used to determine the maximum mechanical deflection angle $\theta_{max}$. Consequently, the measurement of $\theta_{max}$ no longer has to be done during manufacturing. Instead, $\theta_{max}$ can be determined during an initiation or warm-up routine in the laser printer 11. Even if the $\theta_{max}$ of the oscillating mirror 17 were to change after manufacturing (e.g. due to environmental changes, aging, etc.), the system would still function correctly since $\theta_{max}$ can be now be self-determined.

A control circuit 35 is coupled to the beam detector 18 to calculate the maximum mechanical deflection angle $\theta_{max}$. The beam detector 18 sends a signal to the control circuit 35 whenever the reflected light beam 21 strikes the beam detector 18. The control circuit 35 determines the time interval between the signals from the beam detector 18, plugs that information into the appropriate equation that describes the mechanical deflection angle θ, and calculates the maximum mechanical deflection angle $\theta_{max}$. One of ordinary skill in the art will understand that there are many ways to implement control circuit 35, including specialized electronic circuitry or a microprocessor. The control circuit 35 is also coupled to the light source 13, and uses the maximum mechanical deflection angle $\theta_{max}$ (along with other information about the oscillating mirror 17 such as its frequency) to control the timing and intensity of the light source 13 and thus the image created on the photosensitive drum 15.

Other patterns for mechanical deflection θ (other than sinusoidal) are also possible, depending on the drive system and other forces on the oscillating mirror 17, but as long as its mechanical deflection θ can be reliably predicted, the same concept of using a single beam detector 18 can be applied.

Figure 4:
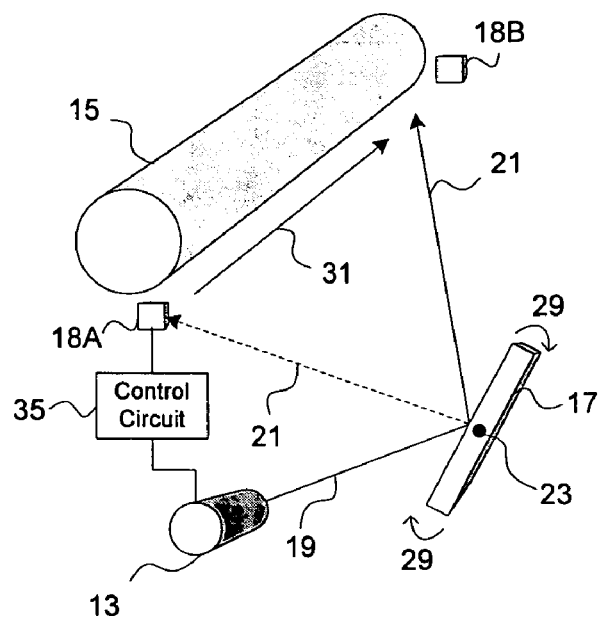
FIG. 4 illustrates a laser printer having two beam detectors.
Figure 5:
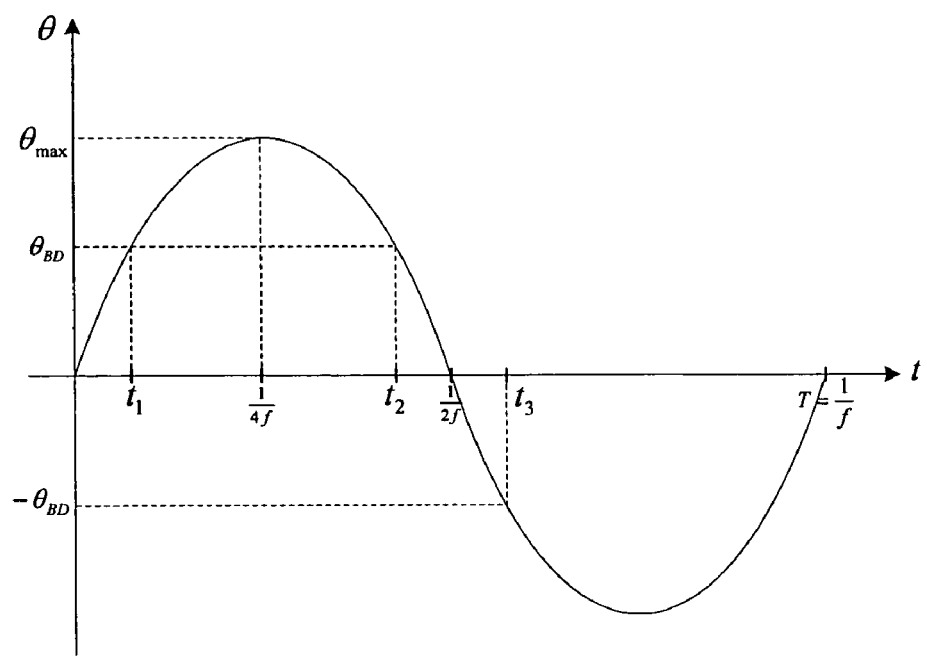
FIG. 5 illustrates a graph of the mechanical deflection of the oscillating mirror versus time for the laser printer of FIG. 4.

In an alternate embodiment, two beam detectors may be used to detect the reflected beam from the oscillating mirror. FIG. 4 shows a laser printer 11 having two beam detectors 18A and 18B. The beam detectors 18A and 18B are placed such that the reflected beam 21 strikes the first beam detector 18A at beam detection angle $\theta_{BD}$ and the reflected beam 21 strikes the second beam detector 18B at beam detection angle $-\theta_{BD}$. These detection times are shown in FIG. 5 as times $t_2$ and $t_3$. Using mathematical logic similar to that for the single beam detector embodiment previously described:

$$y = A\sin(2\pi ft - \varphi)$$

$$\theta_{BD} = \theta_{max}\sin(2\pi ft_2)$$

$$\theta_{BD} = \theta_{max}\sin\left[2\pi f\left(\frac{1}{2f} - \frac{(t_3 - t_2)}{2}\right)\right]$$

$$\theta_{max} = \frac{\theta_{BD}}{\sin\left[2\pi f\left(\frac{1}{2f} - \frac{(t_3 - t_2)}{2}\right)\right]}$$

The two detectors can also be located at two different mechanical deflection angles of the oscillating mirror. The mathematical logic is a little more complex to account for the non-symmetries, but the process for determining the maximum mechanical deflection angle follows a similar logic to that already discussed for the previous embodiments.

Although the present invention has been described in detail with reference to particular preferred embodiments, persons possessing ordinary skill in the art to which this invention pertains will appreciate that various modifications and enhancements may be made without departing from the spirit and scope of the claims that follow.

I claim:

1. A method for controlling a light source to generate a light beam on a photosensitive surface, the method comprising:
   oscillating a mirror;
   reflecting a light beam with the mirror so that the reflected light beam travels across a photosensitive surface;
   detecting a first reflected beam at a first moment;
   detecting a second reflected beam at a second moment, at least one of the first reflected beam or the second reflected beam is detected by a beam detector outside of the photosensitive surface;
   determining a maximum mechanical deflection angle for the mirror based on the detected first reflected beam and the detected second reflected beam;
   determining a frequency of the mirror based on the detected first reflected beam and the detected second reflected beam; and
   controlling the light source, responsive to both the determined maximum mechanical deflection angle and the determined frequency, in order to adjust intensity of the light beam on the photosensitive surface so that the light source is controlled when the mirror is being operated at any one of a plurality of frequencies.

2. A method as in claim 1, further comprising determining a time interval between the first moment and the second moment; and
   wherein determining the maximum mechanical deflection angle comprises using the time interval in an equation that describes a mechanical deflection angle of the mirror over time.

3. A method as in claim 2, wherein the equation is sinusoidal.

4. A method as in claim 1, wherein detecting the first reflected beam and the second reflected beam is accomplished with a single beam detector.

5. A method as in claim 1, wherein detecting the first reflected beam and the second reflected beam is accomplished with more than one beam detector.

6. A method as in claim 5, wherein:
   the first reflected beam is detected by a first beam detector positioned at a first mechanical deflection angle of the mirror;
   the second reflected beam is detected by a second detector positioned at a second mechanical deflection angle of the mirror; and
   wherein the first and second mechanical deflection angles have the same magnitude but opposite signs.

7. A laser printer, comprising:
   a light source for emitting a light beam;
   a photosensitive surface;
   an oscillating reflective surface for reflecting the light beam to create a reflected light beam that travels across the photosensitive surface;
   at least one beam detector positioned between the reflective surface and the photosensitive surface to detect a plurality of reflected light beams, at least one of the plurality of reflected light beams being detected outside of the photosensitive surface; and
   a control circuit in communication with the at least one beam detector for calculating a maximum mechanical deflection angle of the oscillating reflective surface, for determining a frequency of the oscillating reflective surface based on the detected plurality of reflected light beams, the determined frequency being one of a plurality of frequencies, and for controlling the light source, responsive to both the calculated maximum mechanical deflection angle and the determined frequency, in order to adjust intensity of the light beam on the photosensitive surface so that the light source is controlled when the mirror is being operated at any one of a plurality of frequencies.

8. A laser printer as in claim 7, wherein the oscillating reflective surface is part of a Micro Electro Mechanical System (MEMS) device.

9. A laser printer as in claim 8, wherein the MEMS device rotates about a central axis.

10. A laser printer as in claim 7, wherein the mechanical deflection angle of the oscillating reflective surface can be described by a mathematical equation.

11. A laser printer as in claim 10, wherein the mathematical equation is a sinusoid.

12. A laser printer as in claim 7, wherein the control circuit calculates a time interval between the detections of the plurality of reflected light beams.

13. A laser printer as in claim 12, wherein an initiation period is used to calculate the maximum mechanical deflection angle when the printer is powered on.

14. A laser printer as in claim 7, wherein the at least one beam detector comprises a first beam detector for detecting a first reflected light beam and a second beam detector for detecting a second reflected light beam.

15. A laser printer as in claim 14, wherein
   the first beam detector is positioned at a first mechanical deflection angle with respect to the oscillating reflective surface;

the second beam detector is positioned at a second mechanical deflection angle with respect to the oscillating reflective surface; and wherein the first and second mechanical deflection angles have the same magnitude but opposite signs.

16. A method as in claim 1, wherein the first reflected beam is detected when the first reflected beam is not intersecting the photosensitive surface; and wherein the second reflected beam is detected when the second reflected beam is not intersecting the photosensitive surface.

17. A method as in claim 1, wherein the light beam is emitted by a light source; and wherein the beam detector is positioned closer to the light source than to the photosensitive surface.

18. A method as in claim 1, wherein the reflected light beam travels in a forward pass and travels back in a return pass, part of each of the forward pass and the return pass traveling across the photosensitive surface;

wherein the first reflected beam is detected in one of the forward pass or the return pass; and wherein the second reflected beam is detected in the other of the forward pass or the return pass.

19. A method as in claim 1, wherein the photosensitive surface comprises a photosensitive drum.

20. A laser printer as in claim 7, wherein the plurality of reflected light beams are detected when the plurality of reflected light beams are not intersecting the photosensitive surface.

21. A laser printer as in claim 7, wherein the at least one beam detector is positioned closer to the light source than to the photosensitive surface.

22. A laser printer as in claim 7, wherein the reflected light beam travels in a forward pass and travels back in a return pass, part of each of the forward pass and the return pass traveling across the photosensitive surface; and wherein the at least one beam detector detects a first reflected beam in one of the forward pass or the return pass and detects a second reflected beam in the other of the forward pass or the return pass.

23. A laser printer as in claim 7, wherein the photosensitive surface comprises a photosensitive drum.

24. A laser printer, comprising:

means for emitting a light beam;

means for reflecting the light beam to create an oscillating reflected light beam;

means for forming an image using the reflected light beam;

means for detecting a plurality of reflected light beams, the means for detecting positioned between the means for reflecting and the means for forming, at least one of the plurality of reflected light beams being detected by the means for detecting outside of the means for forming an image;

means for determining a maximum mechanical deflection angle of the means for reflecting the light beam based on the detected plurality of reflected light beams;

means for determining a frequency of the means for reflecting the light beam based on the detected plurality of reflected light beams, the determined frequency being one of a plurality of frequencies; and means for controlling the means for emitting a light beam, responsive to both the determined maximum mechanical deflection angle and the determined frequency, in order to adjust intensity of the light beam on the means for forming an image using the reflected light beam so that the means for forming an image is controlled when the means for reflecting the light beam is being operated at any one of a plurality of frequencies.

25. A laser printer as in claim 24, wherein the means for determining a maximum deflection angle calculates a time interval between detections of a first reflected beam and a second reflected beam.

26. A laser printer as in claim 24, wherein the means for detecting is positioned closer to the means for emitting a light beam than to the means for forming an image.

27. A laser printer as in claim 24, wherein the means for forming an image using the reflected light beam comprises a photosensitive drum.

28. A method as in claim 1, wherein adjusting control of intensity of the light source comprises adjusting timing and the intensity of the light source based on the determined maximum mechanical deflection angle and the determined frequency.

29. A laser printer as in claim 7, wherein the control circuit adjusts timing and the intensity of the light source based on the calculated maximum mechanical deflection angle and the determined frequency.

30. A laser printer as in claim 24, wherein the means for adjusting control adjusts timing and the intensity of the means for emitting a light beam based on the determined maximum mechanical deflection angle and the determined frequency.

31. A method as in claim 1, further comprising, responsive to both the determined maximum mechanical deflection angle and the determined frequency, determining a position of the reflected light beam on the photosensitive surface and a velocity of the reflected light beam at the position; and wherein the intensity of the light beam is adjusted for the velocity of the reflected light beam at the position.

32. A method as in claim 1, wherein the light source is controlled without changing the frequency of the mirror.

33. A laser printer as in claim 7, wherein the control circuit controls the light source without changing the frequency of the mirror.

34. A laser printer as in claim 24, wherein the means for controlling controls the means for emitting a light beam without changing the frequency of the means for reflecting the light beam.

* * * * *